United States Patent
Huang

(10) Patent No.: US 9,049,437 B2
(45) Date of Patent: *Jun. 2, 2015

(54) SOLID STATE ILLUMINATOR FOR STEREOSCOPIC DISPLAY

(71) Applicant: DELTA ELECTRONICS, INC., Taoyuan Hsien (TW)

(72) Inventor: June-Jei Huang, Taoyuan Hsien (TW)

(73) Assignee: DELTA ELECTRONICS, INC. (TW)

(*) Notice: Subject to any disclaimer, the term of this patent is extended or adjusted under 35 U.S.C. 154(b) by 171 days.

This patent is subject to a terminal disclaimer.

(21) Appl. No.: 13/796,099

(22) Filed: Mar. 12, 2013

(65) Prior Publication Data
US 2014/0119003 A1    May 1, 2014

(30) Foreign Application Priority Data

Oct. 31, 2012   (TW) .............................. 101140228 A

(51) Int. Cl.
*G03B 21/00* (2006.01)
*H04N 13/04* (2006.01)
*H04N 9/31* (2006.01)

(52) U.S. Cl.
CPC ......... *H04N 13/0431* (2013.01); *H04N 9/3114* (2013.01); *H04N 9/3158* (2013.01); *H04N 13/0459* (2013.01)

(58) Field of Classification Search
CPC .......... H04N 13/0422; H04N 13/0431; H04N 13/0459
USPC .................. 353/7, 20, 31, 84, 94; 349/5, 7–9; 348/742–747, 758, E9.027; 359/462, 359/464, 466; 362/235, 277
See application file for complete search history.

(56) References Cited

U.S. PATENT DOCUMENTS

| 8,610,088 | B2 * | 12/2013 | Westphal et al. | ........... 250/484.4 |
| 8,764,196 | B2 * | 7/2014 | Redmann | ........................... 353/7 |
| 2006/0087847 | A1 * | 4/2006 | Yamanaka | ...................... 362/277 |
| 2006/0098451 | A1 * | 5/2006 | Hsu et al. | ........................ 362/555 |
| 2008/0151193 | A1 | 6/2008 | Reder | |
| 2008/0284982 | A1 * | 11/2008 | Richards et al. | ................. 352/38 |
| 2009/0141242 | A1 | 6/2009 | Silverstein et al. | |
| 2009/0213330 | A1 | 8/2009 | Silverstein et al. | |

(Continued)

FOREIGN PATENT DOCUMENTS

| TW | 200931159 | 7/2009 |
| TW | 200942863 | 10/2009 |

(Continued)

*Primary Examiner* — Sultan Chowdhury
(74) *Attorney, Agent, or Firm* — Lowe Hauptman & Ham, LLP

(57) ABSTRACT

A solid state illuminator for a stereoscopic display includes a first solid state light source, a wavelength conversion color wheel, an actuator, a multi-band filter, and an optical module. The first solid state light source provides a first light beam with a first wavelength. The wavelength conversion color wheel includes a first transmission segment and a reflection segment. The first light beam passes through the first transmission segment and is converted into a second light beam with a second wavelength, and is reflected by the first reflection segment and is converted into a third light beam with the second wavelength. The multi-band filter transmits a portion of each of the second light beam and the third light beam, and reflects another portion thereof. The wavelength ranges of these two portions are not overlapped. The optical module guides light beams to the multi-band filter.

20 Claims, 6 Drawing Sheets

(56) References Cited

U.S. PATENT DOCUMENTS

2012/0133649 A1 5/2012 Reder
2012/0133846 A1* 5/2012 Ishii .............................. 348/744
2012/0201030 A1 8/2012 Yuan et al.

FOREIGN PATENT DOCUMENTS

| TW | 201137498 | 11/2011 |
| TW | M423266 | 2/2012 |
| TW | M426048 | 4/2012 |

* cited by examiner

SOLID STATE ILLUMINATOR FOR STEREOSCOPIC DISPLAY

RELATED APPLICATIONS

This application claims priority to Taiwan Application Serial Number 101140228, filed Oct. 31, 2012, which is herein incorporated by reference.

BACKGROUND

1. Technical Field

The present disclosure relates to a stereoscopic display illuminator.

2. Description of Related Art

By exploiting the binocular parallax of humans, a stereoscopic display device provides two slightly different images to respective left and right eyes of an observer so as to generate a stereoscopic image. According to the method difference for providing the different images, the general stereoscopic display technologies include a polarization 3D technology, an anaglyphic 3D technology, and a wavelength multiplexing 3D technology.

The stereoscopic display device with the wavelength multiplexing technology generates a stereoscopic image by providing images with different wavelength ranges to observers. The general color display device produces various colors in the color space by mixing the additive primary colors, i.e. red (R), green (G), and blue (B). Therefore, the stereoscopic display device with the wavelength multiplexing technology can produce left-eye images with a set of primary colors R1, G1, and B1, and right-eye images with the other set of primary colors R2, G2, and B2, respectively.

The conventional stereoscopic display device with the wavelength multiplexing technology produces two sets of three primary colors by using two light sources which not only enlarge the size of the device, but also cause an alignment problem between two sets images. Therefore, how to improve the aforementioned disadvantages when the size of the stereoscopic display device is shrunk is a constant striving in the industry.

SUMMARY

A solid state illuminator for a stereoscopic display includes at least one first solid state light source, a wavelength conversion color wheel, an actuator, a multi-band filter, and an optical module. The at least one first solid state light source is used for providing a first light beam with a first wavelength range. The wavelength conversion color wheel includes at least one first transmission segment and at least one first reflection segment. The actuator is used for rotating the wavelength conversion color wheel. When the first light beam impinges on the first transmission segment, the first light beam passes through the first transmission segment and is converted into a second light beam with a second wavelength range, and when the first light beam impinges on the first reflection segment, the first light beam is reflected by the first reflection segment and is converted into a third light beam with the second wavelength range. The multi-band filter is used for allowing at least one portion of each of the second light beam and the third light beam through the multi-band filter to pass therethrough, and reflecting at least one another portion of each of the second light beam and the third light beam, wherein the wavelength ranges of the two portions are not overlapped. The optical module is used for guiding the second light beam and the third light beam to the multi-band filter, such that the portion of one of the second light beam and the third light beam passes through the multi-band filter and reaches a goal position, and the another portion of the other of the second light beam and the third light beam is reflected by the multi-band filter and reaches the goal position.

In one or more embodiments, the wavelength conversion color wheel optionally further includes a first filtering segment. The first light beam passes through the first filtering segment without converting its first wavelength range (i.e. with its first wavelength range maintained) when the first light beam impinges on the first filtering segment. The optical module is optionally further used for guiding the first light beam to the multi-band filter, such that the first light beam is reflected by the multi-band filter and reaches the goal position.

In one or more embodiments, the wavelength conversion color wheel optionally further includes at least one second transmission segment and at least one second reflection segment. When the first light beam impinges on the second transmission segment, the first light beam passes through the second transmission segment and is converted into a fourth light beam with a third wavelength range, and when the first light beam impinges on the second reflection segment, the first light beam is reflected by the second reflection segment and is converted into a fifth light beam with the third wavelength range. The multi-band filter is optionally further used for allowing at least one portion of each of the fourth light beam and the fifth light beam to pass therethrough, and reflecting at least one another portion of the fourth light beam and the fifth light beam, wherein the wavelength ranges of the two portions are not overlapped. The optical module is optionally further used for guiding the fourth light beam and the fifth light beam to the wavelength conversion color wheel, such that the portion of one of the fourth light beam and the fifth light beam passes through the multi-band filter and reaches the goal position, and at least another one portion of the other of the fourth light beam and the fifth light beam is reflected by the multi-band filter and reaches the goal position.

In one or more embodiments, the solid state illuminator optionally further includes at least one solid state second light source for providing a sixth light beam with a fourth wavelength range. The wavelength conversion color wheel optionally further includes a second filtering segment. The sixth light beam passes through the second filtering segment without converting its fourth wavelength range when the sixth light beam impinges on the second filtering segment. The optical module is optionally further used for guiding the sixth light beam to the multi-band filter, such that the sixth light beam is reflected by the multi-band filter and reaches the goal position.

In one or more embodiments, the sixth light beam also optionally passes through the first transmission segment and is converted into the second light beam with the second wavelength range when the sixth light beam impinges on the first transmission segment.

In one or more embodiments, the sixth light beam is also optionally reflected by the first reflection segment and is converted into the third light beam with the second wavelength range when the sixth light beam impinges on the first reflection segment.

In one or more embodiments, the optical module optionally includes a reflective mirror and a dichroic mirror. The reflective mirror is used for reflecting the third light beam to the dichroic mirror, and the dichroic mirror is used for reflecting the third light beam to the multi-band filter.

In one or more embodiments, the dichroic mirror is optionally disposed between the first light source and the reflective mirror. The first light beam passes through the dichroic mirror, and the reflective mirror is further used for reflecting the first light beam to the wavelength conversion color wheel.

In one or more embodiments, the optical module optionally further includes a plurality of condenser lenses disposed between the reflective mirror and the dichroic mirror, and disposed between the reflective mirror and the wavelength conversion color wheel, respectively.

In one or more embodiments, the optical module optionally includes a reflective mirror and a prism group. The reflective mirror is used for reflecting the second light beam to the prism group, and the prism group is used for reflecting the second light beam to the multi-band filter.

In one or more embodiments, the prism group is optionally disposed between the multi-band filter and the goal position. The prism group is configured for allowing the first light beam, the second light beam, and the third light beam all propagated from the multi-band filter to pass therethrough.

In one or more embodiments, the optical module optionally further includes a plurality of condenser lenses disposed between the wavelength conversion color wheel and the reflective mirror, between the reflective mirror and the prism group, and between the prism group and the goal position, respectively.

In one or more embodiments, the optical module optionally includes a prism group for reflecting the third light beam to the multi-band filter.

In one or more embodiments, the prism group is optionally disposed between the first light source and the wavelength conversion color wheel, and the prism group is configured for allowing the first light beam to pass therethrough.

In one or more embodiments, the optical module optionally includes a concave mirror for reflecting the first light beam and the second light beam to the prism group, and the prism group is further used for reflecting the first light beam and the second light beam to the multi-band filter.

In one or more embodiments, the optical module optionally further includes a reflective prism. The reflective prism and the prism group define a total internal reflection gap therebetween. An interface between the reflective prism and the total internal reflection gap is used for reflecting the first light beam, the second light beam, and the third light beam all propagated from the multi-band filter to the goal position.

In one or more embodiments, the reflective prism is optionally disposed between the multi-band filter and the prism group. The interface between the reflective prism and the total internal reflection gap is configured for allowing light beams propagated from the prism group to pass therethrough.

In one or more embodiments, the optical module optionally further includes a condenser lens disposed between the reflective prism and the goal position.

In one or more embodiments, the optical module optionally further includes a reflective mirror for reflecting the third light beam transmitted from the multi-band filter back to the multi-band filter, such that the third light beam passes through the multi-band filter again and is incident to the reflective prism, and then the third light beam reaches the goal position through the reflection by the total internal reflection gap.

In one or more embodiments, the optical module optionally further includes a plurality of copy lenses disposed between the wavelength conversion color wheel and the prism group.

In one or more embodiments, the first light beam may optionally be a left-eye blue light beam, the second light beam may optionally be a first red primary-color light beam, the third light beam may optionally be a second red primary-color light beam, the fourth light beam may optionally be a first green primary-color light beam, the fifth light beam may optionally be a second green primary-color light beam, and the sixth light beam may optionally be a right-eye blue light beam. The first transmission segment may optionally be a red primary-color transmission segment, the first reflection segment may optionally be a red primary-color reflection segment, the second transmission segment may optionally be a green primary-color transmission segment, the second reflection segment may optionally be a green primary-color reflection segment, the first filtering segment may optionally be a left-eye blue light filtering segment, and the second filtering segment may optionally be a right-eye blue light filtering segment. The first wavelength range, the second wavelength range, the third wavelength range, and the fourth wavelength range may optionally be a left-eye blue light wavelength range, a red primary-color wavelength range, a green primary-color wavelength range, and a right-eye blue light wavelength range, respectively.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
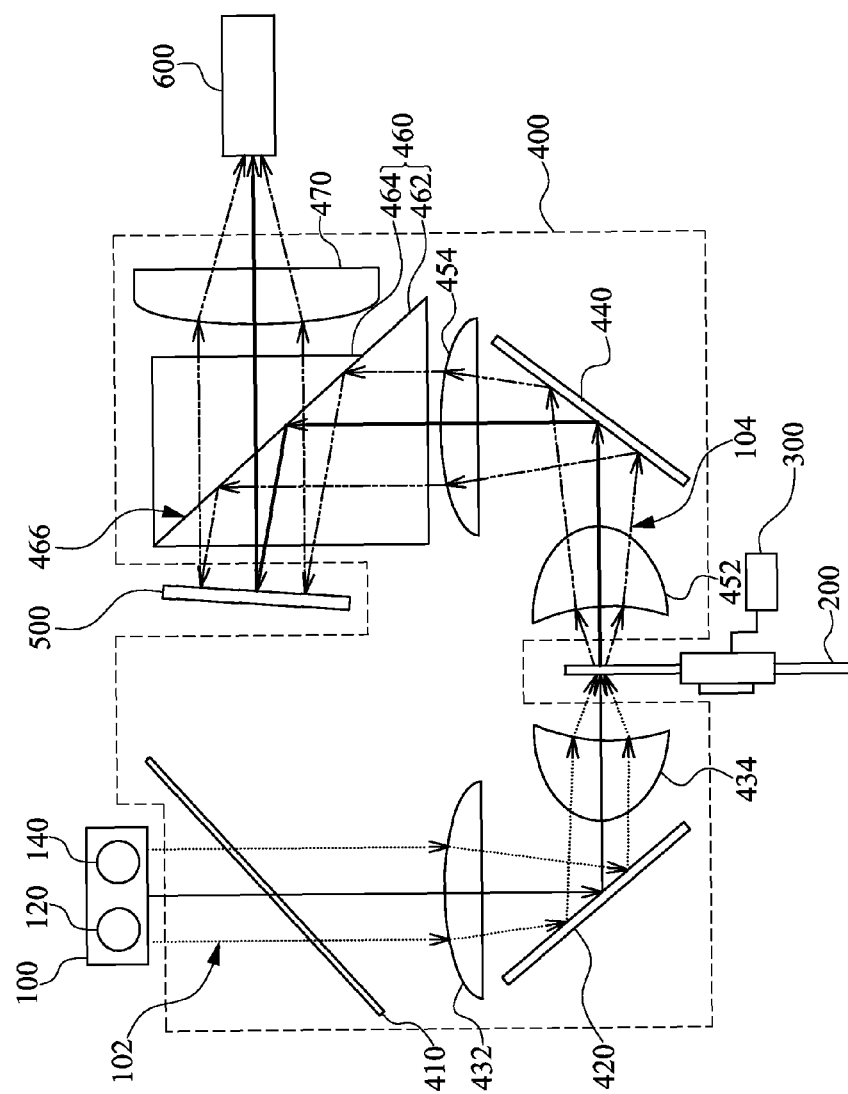
FIG. 1 is an optical path schematic diagram for a solid state illuminator for a stereoscopic display in a plurality of time periods according to an embodiment of the present invention.

FIG. 1 is an optical path schematic diagram for a solid state illuminator for a stereoscopic display in a plurality of time periods according to an embodiment of the present invention. The solid state illuminator includes a light source 100, a wavelength conversion color wheel 200, an actuator 300, an optical module 400, and a multi-band filter 500. The light source 100 may include a first solid sate light source 120 and a second solid state light source 140 for providing a left-eye blue light beam and a right-eye blue light beam, respectively. The left-eye blue light beam and the right-eye blue light beam are both guided to the wavelength conversion color wheel 200 by the optical module 400. The wavelength conversion color wheel 200 is used for converting the left-eye blue light beam and the right-eye blue light beam into different primary-color light beams, or allowing one of the left-eye blue light beam and right-eye blue light beam to pass therethrough in sequence. The different primary-color light beams, the left-eye blue light beam, and the right-eye blue light beam are then guided to the multi-band filter 500 by the optical module 400. The multi-band filter 500 is used for reflecting the left-eye blue light beam and the right-eye blue light beam, allowing one portion of each primary-color light beam to pass therethrough, and reflecting another portion of each primary-color light beam, wherein the wavelengths of these two portions are not overlapped. Therefore, the different primary-color light beams can be further split into a left-eye primary-color light beam and a right-eye primary-color light beam. The optical module 400 then guides light beams passing through the multi-band filter 500 to a goal position 600. Thus, the left-eye primary-color light beam and the right-eye primary-color light beam can be obtained in sequence by using the solid state illuminator for a stereoscopic display according to the present embodiment.

Figure 2:
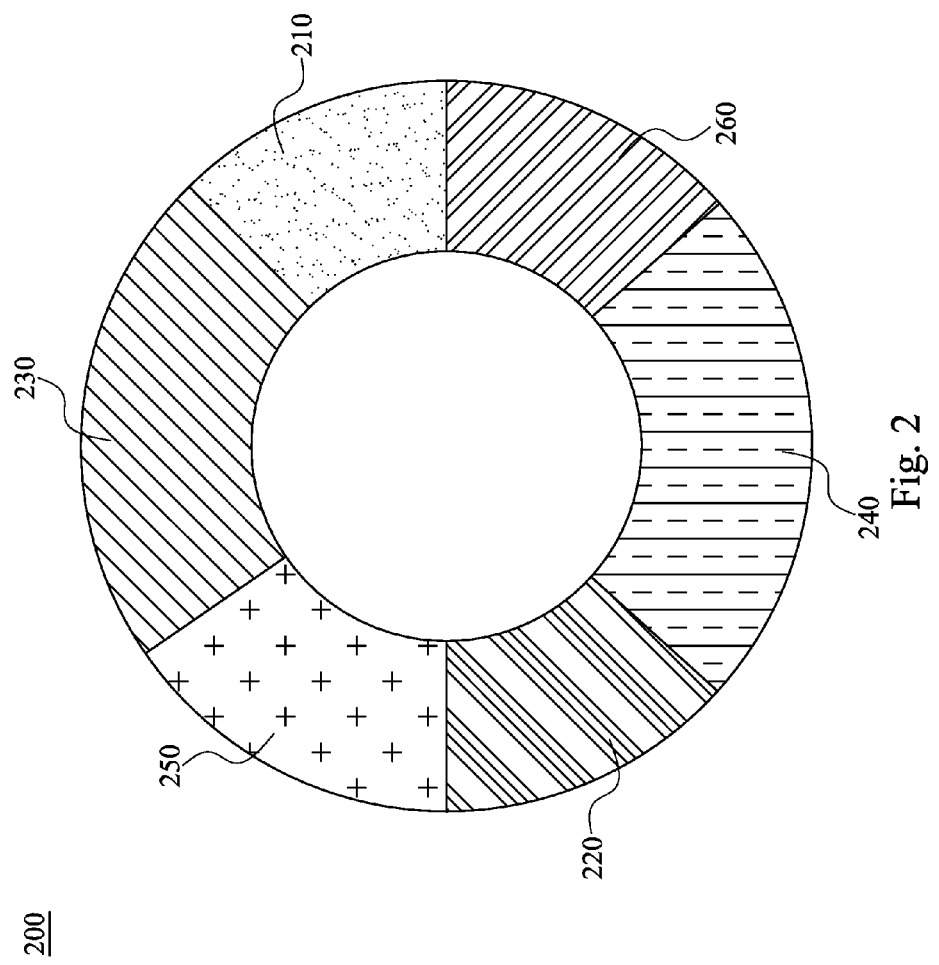
FIG. 2 is a front view of a wavelength conversion color wheel shown in FIG. 1.

FIG. 2 is a front view of the wavelength conversion color wheel 200 shown in FIG. 1. The wavelength conversion color wheel 200 includes a red primary-color transmission segment 210, a red primary-color reflection segment 220, a green primary-color transmission segment 230, a green primary-color reflection segment 240, a left-eye blue light filtering segment 250, and a right-eye blue light filtering segment 260. As shown in FIG. 1, the actuator 300 is used for rotating the wavelength conversion color wheel 200, such that the red primary-color transmission segment 210, the red primary-color reflection segment 220, the green primary-color transmission segment 230, the green primary-color reflection segment 240, the left-eye blue light filtering segment 250, and the right-eye blue light filtering segment 260 can be disposed on the propagation paths of the left-eye blue light beam and right-eye blue light beam in certain time periods, respectively.

Figure 3:
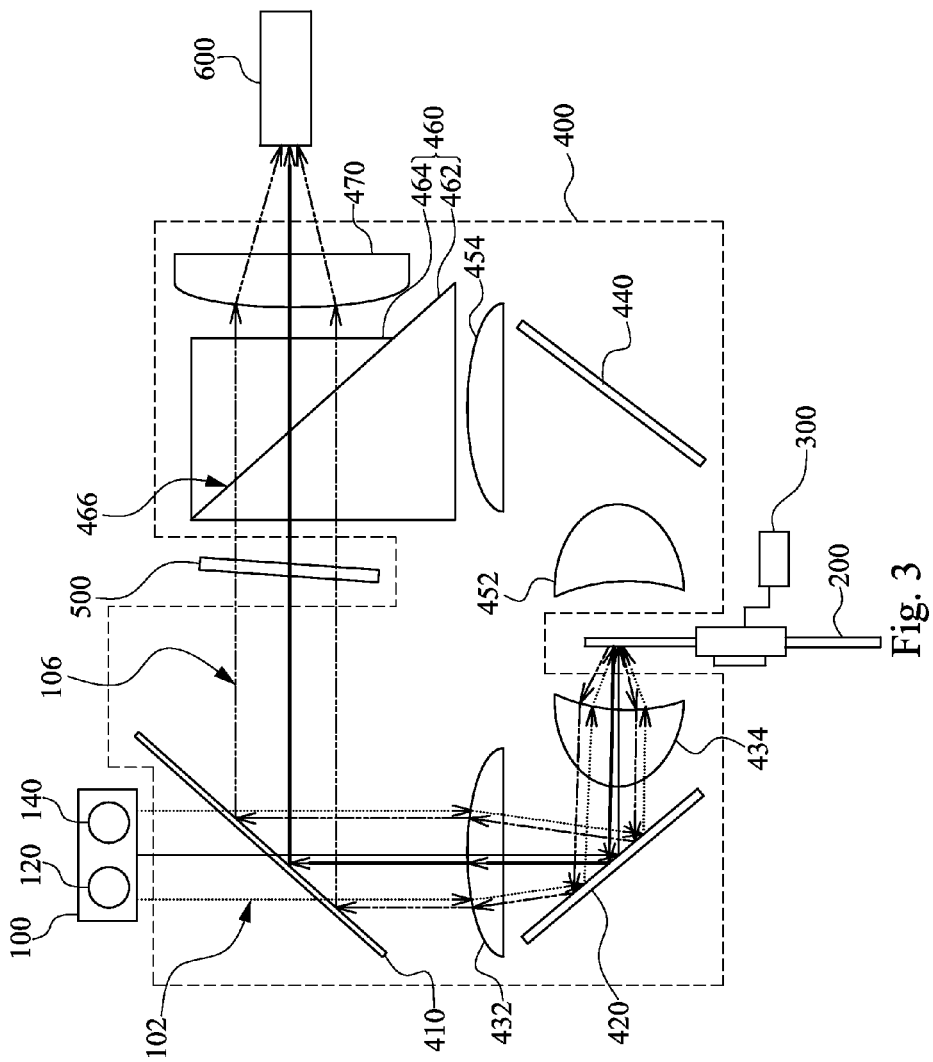
FIG. 3 is an optical path schematic diagram for the solid state illuminator for a stereoscopic display in another plurality of time periods according to an embodiment of the present invention.

It should be understood that, the solid arrows in FIG. 1 and FIG. 3 represent central propagation paths of light beams, and the dashed arrows in FIG. 1 and FIG. 3 represent edge propagation paths of light beams. As shown in FIG. 1, during a particular time period, when the left-eye blue light beam and the right-eye blue light beam impinge on the red primary-color transmission segment 210 along a path 102, the left-eye blue light beam and the right-eye blue light beam pass through the red primary-color transmission segment 210 and are converted into a first red primary-color light beam with a red primary-color wavelength range. The optical module 400 guides the first red primary-color light beam to the multi-band filter 500 along a path 104. The multi-band filter 500 reflects a portion of the first red primary-color light beam which is a left-eye red primary-color light beam. The left-eye red primary-color light beam is then guided to the goal position 600 by the optical module 400. As to the processes of the left-eye blue light beam and right-eye blue light beam passing through the green primary-color transmission segment 230 to be converted into a first green primary-color light beam and further become a left-eye green primary-color light beam, since they are similar to the process of forming the left-eye red primary-color light beam, the details of the processes are not repeated herein.

In another time period, when the left-eye blue light beam and the right-eye blue light beam impinge on the left-eye blue light filtering segment 250 along the path 102, the left-eye blue light beam passes through the left-eye blue light filtering segment 250 with its wavelength range maintained. However, the right-eye blue light beam is filtered by the left-eye blue light filtering segment 250. The optical module 400 guides the left-eye blue light beam to the multi-band filter 500 along the path 104. The multi-band filter 500 reflects the left-eye blue light beam which is then guided to the goal position 600 by the optical module 400. On the other hand, since the processes of the left-eye blue light beam and right-eye blue light beam after passing through the right-eye blue light filtering segment 260 to become the right-eye blue light beam, and reach the goal position 600 are similar to the process of forming the left-eye blue light beam, the details of the processes are not repeated herein.

FIG. 3 is an optical path schematic diagram for the solid state illuminator for a stereoscopic display in another plurality of time periods according to an embodiment of the present invention. In another time period, when the left-eye blue light beam and the right-eye blue light beam impinge on the red primary-color reflection segment 220 along the path 102, the left-eye blue light beam and the right-eye blue light beam are reflected by the red primary-color reflection segment 220 and are converted into a second red primary-color light beam with the red primary-color wavelength range. The optical module 400 guides the second red primary-color light beam to the multi-band filter 500 along a path 106. The multi-band filter 500 reflects a portion of the second red primary-color light beam which is a right-eye red primary-color light beam. The right-eye red primary-color light beam is then guided to the goal position 600 by the optical module 400. As to the processes of the left-eye blue light beam and right-eye blue light beam reflected by the green primary-color reflection segment 240 to be converted into a second green primary-color light beam and become a right-eye green primary-color light beam, since they are similar to the process of forming the right-eye red primary-color light beam, the details of the processes are not repeated herein.

In one or more embodiments, the solid state illuminator for a stereoscopic display may not be limited to merely providing three primary-color light beams for right-eye and left-eye images. The wavelength conversion color wheel 200 may include a yellow primary-color transmission segment and a yellow primary-color reflection segment for enhancing the brilliance of the images. It should be understood that the colors of the primary-color transmission segments and the primary-color reflection segments are merely illustrated as examples and do not intend to limit the scope of the claimed invention. A person having ordinary skill in the art may choose the colors of the primary-color transmission segments and the primary-color reflection segments according to actual requirements.

Figure 4:
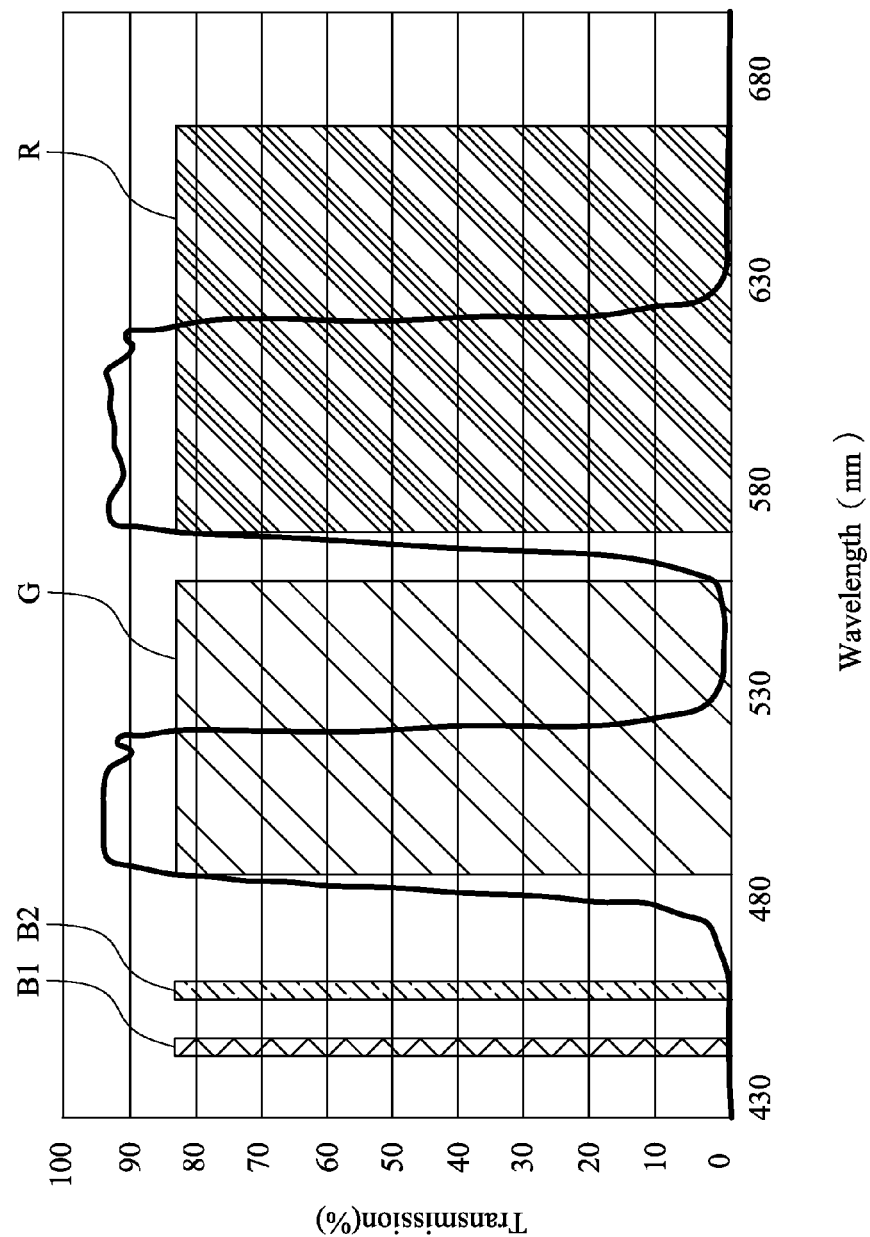
FIG. 4 is a transmission spectrum of a multi-band filter shown in FIG. 1.

FIG. 4 is a transmission spectrum of the multi-band filter 500 shown in FIG. 1. In the present embodiment, the multi-band filter 500 may be designed for reflecting the left-eye blue and right-eye blue light beams; for reflecting at least one portion of light beams with the red primary-color wavelength range (the first red primary-color light beam and the second red primary-color light beam in this embodiment, for example) and light beams with the green primary-color wavelength range (the first green primary-color light beam and the second green primary-color light beam in this embodiment, for example), i.e. light beams with wavelength ranges above 630 nm and between 530 nm and 580 nm, but the scope of the present invention is not limited thereto; and for allowing at least one portion of light beams with the red primary-color wavelength range and light beams with the green primary-color wavelength range, i.e. light beams with wavelength ranges between 580 nm and 630 nm and between 480 nm and 530 nm, to pass therethrough. However, the scope of the claimed invention should not be limited in this respect. Furthermore, the wavelength ranges of the reflection portions and the transmission portions are not overlapped. On the other hand, in FIG. 4, for clarity, the area P represents the red primary-color wavelength range, the area G represents the green primary-color wavelength range, the area B1 represents a left-eye blue wavelength range of the left-eye blue light beam, and the area B2 represents a right-eye blue wavelength range of the right-eye blue light beam.

Therefore, the solid state illuminator for a stereoscopic display can generate three primary colors, i.e. the red primary-color, the green primary-color, and the blue primary-color, light beams in sequence according to the aforementioned structure. The details regarding how to obtain left-eye light beams and right-eye light beams from the solid state illuminator for a stereoscopic display according to the present embodiment are described in the following paragraphs.

Reference is made back to FIG. 1. In this embodiment, the optical module 400 includes a dichroic mirror 410, a reflective mirror 420, and condenser lenses 432 and 434 which are all between the light source 100 and the wavelength conversion color wheel 200. The dichroic mirror 410 disposed between the light source 100 and the reflective mirror 420 allows blue light beams, i.e. the left-eye blue light beam and the right-eye blue light beam in this embodiment, to pass therethrough, and reflects light beams reflected from the wavelength conversion color wheel 200, i.e. the second red primary-color light beam and the second green primary-color light beam in this embodiment, to the multi-band filter 500. The reflective mirror 420 is used for reflecting the left-eye blue light beam and the right-eye blue light beam to the wavelength conversion color wheel 200, and reflecting the light beams reflected from the wavelength conversion color wheel 420 to the dichroic mirror 410. The condenser lens 432 is disposed between the reflective mirror 420 and the dichroic mirror 410, and the condenser lens 424 is disposed between the reflective mirror 420 and the wavelength conversion color wheel 200. On the other hand, the optical module 400 further includes a reflective mirror 440, a prism group 460, and condenser lenses 452, 454, and 470 which are all between the wavelength conversion color wheel 200 and the goal position 600. The reflective mirror 440 is used for reflecting light beams transmitted from the wavelength conversion color wheel 200, i.e. the first red primary-color light beam, the first green primary-color light beam, the left-eye blue light beam, and the right-eye blue light beam in this embodiment, to the prism group 460. The prism group 460 includes a first prism 462 and a second prism 464, wherein the first prism 462 and the second prism 464 define a total internal reflection gap 466 therebetween. The prism group 460 disposed between the multi-band filter 500 and the goal position 600 is used for reflecting the light beams transmitted from the wavelength conversion color wheel 200 to the multi-band filter 500, and allowing the light beams propagated from the multi-band filter 500, i.e. the portion of the first red primary-color light beam, the portion of the second red primary-color light beam, the portion of the first green primary-color light beam, the portion of the second green primary-color light beam, the left-eye blue light beam, and the right-eye blue light beam in this embodiment, to pass therethrough. The condenser lens 452 is disposed between the wavelength conversion color wheel 200 and the reflective mirror 440, the condenser lens 454 is disposed between the reflective mirror 440 and the prism group 460, and the condenser lens 470 is disposed between the prism group 460 and the goal position 600.

During a particular time period, the red primary-color transmission segment 210, as shown in FIG. 2, of the wavelength conversion color wheel 200 is disposed on the propagation path of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 102 simultaneously. The left-eye blue light beam and the right-eye blue light beam pass through the dichroic mirror 410, and then are reflected by the reflective mirror 420 with light beam converged by the condenser lenses 432 and 434, and impinge on the red primary-color transmission segment 210 of the wavelength conversion color wheel 200. The left-eye blue light beam and the right-eye blue light beam pass through the red primary-color transmission segment 210, and are converted into the first red primary-color light beam with the red primary-color wavelength range as shown in the area R of FIG. 4. Then, as shown by the path 104, the first red primary-color light beam is diverged to be parallel light by the condenser lens 452 and 454, and is reflected by the reflective mirror 440, and propagates to the total internal reflection gap 466 of the prism group 460. The first red primary-color light beam which is incident on an interface of the total internal reflection gap 466 at a large angle is reflected to the multi-band filter 500. Since only a portion of the first red primary-color light beam, i.e. the first red primary-color light beam with a wavelength range above 630 nm, is reflected by the multi-band filter 500, the portion of the first red primary-color light beam is then reflected to the interface of the total internal reflection gap 466 of the prism group 460. The portion of the first red primary-color light beam which is incident on the interface of the total internal reflection gap 466 at a small angle passes through the interface, and reaches the goal position 600 to be the left-eye red primary-color light beam converged by the condenser lens 470.

During a next time period, the green primary-color transmission segment 230, as shown in FIG. 2, of the wavelength conversion color wheel 200 is disposed on the propagation path of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 102 simultaneously. The left-eye blue light beam and the right-eye blue light beam pass through the green primary-color transmission segment 230, and are converted into the first green primary-color light beam with the green primary-color wavelength range, as shown in the area G of FIG. 4. The first green primary-color light beam is then guided to the multi-band filter 500 along the path 104 by the optical module 400. Since only a portion of the first green primary-color light beam, i.e. the first green primary-color light beam with a wavelength range between 530 nm to 580 nm, is reflected by the multi-band filter, the portion of the first green primary-color light beam is then reflected to the optical module 400 again, and reaches the goal position 600 to be the left-eye green primary-color light beam.

During the next time period, the left-eye blue light filtering segment 250, as shown in FIG. 2, of the wavelength conversion color wheel 200 is disposed on the propagation path of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 102 simultaneously. The left-eye blue light beam passes through the left-eye blue light filtering segment 250 and maintains its wavelength range, but the right-eye blue light beam is filtered by the left-eye blue light filtering segment 250. The left-eye blue light beam passing through the wavelength conversion color wheel 200 is guided to the multi-band filter 500 by the optical module 400 along the path 104. Since the multi-band filter 500 reflects the left-eye blue light beam, the left-eye blue light beam is reflected to the optical module 400 again and is guided to the goal position 600.

Reference is made to FIG. 3. During the next time period, the red primary-color reflection segment 220, as shown in FIG. 2, of the wavelength conversion color wheel 200 is disposed on the propagation path of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 102 simultaneously. The left-eye blue light beam and the right-eye blue light beam are reflected by the red primary-color reflection segment 220, and are converted into the second red primary-color light beam with the red primary-color wavelength range, as shown in the area R of FIG. 4. As shown by the path 106, the second red primary-color light beam is then diverged to be parallel light by the condenser lens 434 and 432, and is reflected by the reflective mirror 420, and propagates to the dichroic mirror 410. The second red primary-color light beam is then reflected to the multi-band filter by the dichroic mirror 410. Since only a portion of the second red primary-color light beam, i.e. the second red primary-color light beam with a wavelength range between 580 nm and 630 nm, passes through the multi-band filter 500, the portion of the second red primary-color light beam then reaches the total internal reflection gap 466 of the prism group 460. The portion of the second red primary-color light beam which is incident on the interface of the total internal reflection gap 466 at a small angle passes through the interface, and reaches the goal position 600 to be the right-eye red primary-color light beam converged by the condenser lens 470.

During the next time period, the green primary-color reflection segment 240, as shown in FIG. 2, of the wavelength conversion color wheel 200 is disposed on the propagation path of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 102 simultaneously. The left-eye blue light beam and the right-eye blue light beam are reflected by the green primary-color reflection segment 240, and are converted into the second green primary-color light beam with the green primary-color wavelength range, as shown in the area G of FIG. 4. The second green primary-color light beam is then guided to the multi-band filter 500 along the path 106 by the optical module 400. Since only a portion of the second green primary-color light beam, i.e. the second green primary-color light beam with a wavelength range between 480 nm to 530 nm, passes through the multi-band filter 500, the portion of the second green primary-color light beam is then reflected to the optical module 400 again, and is guided to the goal position 600 to be the right-eye green primary-color light beam.

Reference is made back to FIG. 1. During the next time period, the right-eye blue light filtering segment 260, as shown in FIG. 2, of the wavelength conversion color wheel 200 is disposed on the propagation path of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 102 simultaneously. The right-eye blue light beam passes through the right-eye blue light filtering segment 260 and maintains its wavelength range, but the left-eye blue light beam is filtered by the right-eye blue light filtering segment 260. The right-eye blue light beam passing through the wavelength conversion color wheel 200 is guided to the multi-band filter 500 by the optical module 400 along the path 104. Since the multi-band filter 500 reflects the right-eye blue light beam, the right-eye blue light beam is reflected to the optical module 400 again and is guided to the goal position 600.

Therefore, the solid state illuminator for a stereoscopic display can generate left-eye light beams and right-eye light beams with three different primary colors in sequence as long as the actuator 300 rotates the wavelength conversion color wheel 200 in the way described above. In addition, the size of the solid state illuminator for a stereoscopic display can be reduced through the design of the optical module 400. On the other hand, the left-eye light beams and right-eye light beams are merged into a same propagation path after passing through the goal position 600. In this way, only a light modulator is needed to be included at the propagation path behind the goal position 600. This light modulator can modulate different left-eye light beams and right-eye light beams to different left-eye images and right-eye images, respectively. Therefore, there is not alignment problem of left-eye images and right-eye images occurring in the solid state illuminator of this embodiment.

In one or more embodiments, the transmission segment and the reflection segment with the same primary-color of the wavelength conversion color wheel 200 can be obtained by using a phosphor slice with a coating film coated on different sides of the phosphor slice. For example, both of the red primary-color transmission segment 210 and the red primary-color reflection segment 220, as shown in FIG. 2, can individually include a red primary-color phosphor slice and a red primary-color reflective coating film. The red primary-color phosphor slice absorbs the left-eye blue light beam and/or right-eye blue light beam, and is excited to emit a light beam with the red primary-color wavelength range. The red primary-color reflective coating film reflects the light beam with the red primary-color wavelength range, which means the red primary-color reflective coating film of the red primary-color transmission segment 210 can be coated on a side of the wavelength conversion color wheel 200 close to the condenser lens 434. Therefore, the first red primary-color light beam can propagate along the path 104, as shown in FIG. 1. On the other hand, the red primary-color reflective coating film of the red primary-color reflection segment 220 can be coated on a side of the wavelength conversion color wheel 200 close to the condenser lens 452. Therefore, the second red primary-color light beam can propagate along the path 106, as shown in FIG. 3. However, the scope of the claimed invention should not be limited in this respect.

On the other hand, the first solid state light source 120 and the second solid state light source 140 may be lasers with different wavelengths. For example, the first solid state light source 120 may be a 448 nm blue laser as a left-eye blue light source, and the second solid state light source 140 may be a 460 nm blue laser as a right-eye blue light source. It should be understood that the types and the wavelength ranges of the first solid state light source 120 and the second solid state light source 140 are merely illustrated as examples, and do not intend to limit the scope of the claimed invention. A person having ordinary skill in the art may select the types and the wavelength ranges of the first solid state light source 120 and the second solid state light source 140 according to actual requirements. In addition, in one or more embodiments, the numbers of the first solid state light source 120 and the second solid state light source 140 may be plural. For example, the first solid state light source 120 and the second solid state light source 140 may be alternately disposed to form a light source module for enhancing light intensity. However, the scope of the claimed invention should not be limited in this respect.

An integral rod may be disposed at the goal position 600, such that light beams propagated from the multi-band filter 500 can be converged to the integral rod by the condenser lenses 470. The light beams passing through the integral rod made of high reflective mirrors are multiply internally reflected in the integral rod and become uniform light to enhance the quality. Also, the scope of the claimed invention should not be limited in this respect.

It should be understood that, the aforementioned design of the optical module 400 does not intend to limit the scope of the claimed invention. In one or more embodiments, the beam splitting can be obtained by designing other optical modules. The following paragraphs are detail explanations about other optical module designs. The details about the solid state illuminator for a stereoscopic display described above are not repeated herein, and only further information is supplied.

Figure 5:
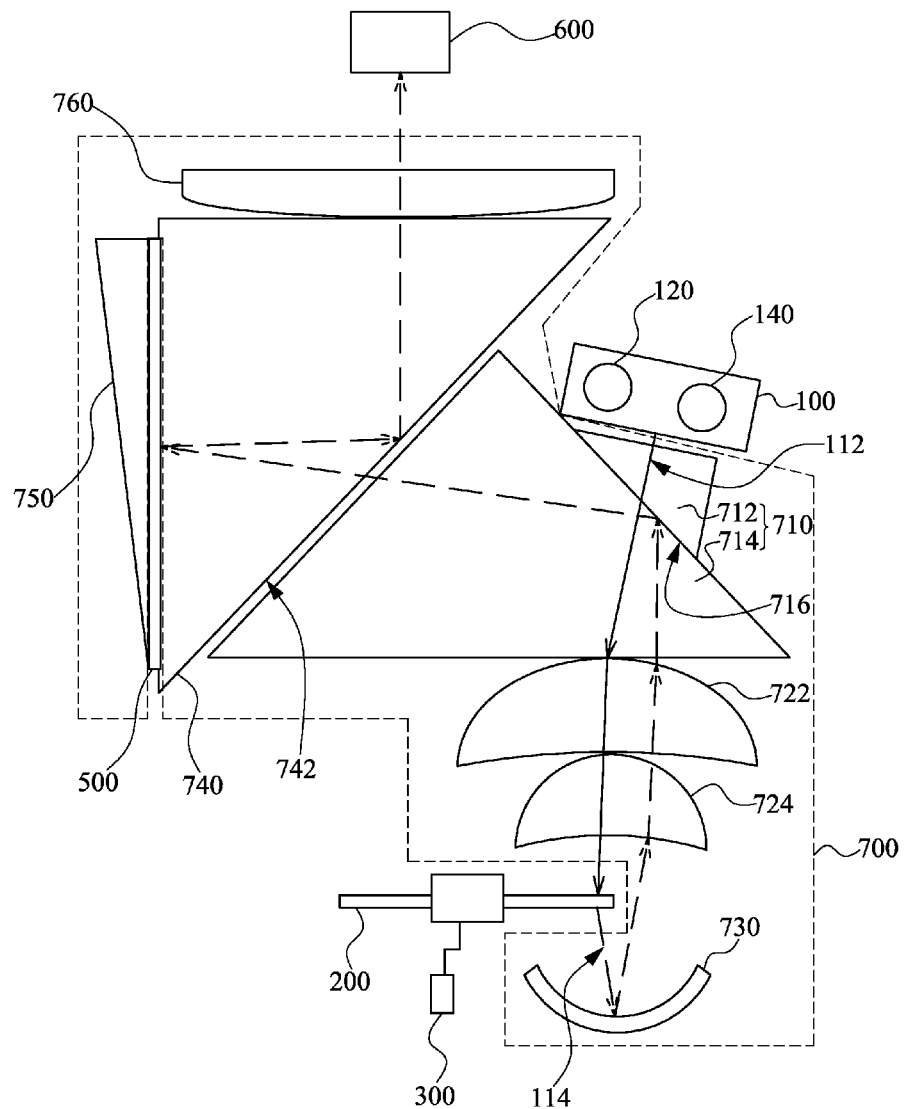
FIG. 5 is an optical path schematic diagram for a solid state illuminator for a stereoscopic display in a plurality of time periods according to another embodiment of the present invention.

FIG. 5 is an optical path schematic diagram for s solid state illuminator for s stereoscopic display in a plurality of time periods according to another embodiment of the present invention. The solid state illuminator for a stereoscopic display includes a first solid state light source 120, a second solid state light source 140, a wavelength conversion color wheel 200, an actuator 300, an optical module 700, and a multi-band filter 500. The optical module 700 includes a prism group 710 and copy lenses 722 and 724 between the first and second solid state light sources 120/140 and the wavelength conversion color wheel 200. The prism group 710 is disposed between the first and second solid state light sources 120/140 and the wavelength conversion color wheel 200. The prism group 710 includes a third prism 712 and a fourth prism 714, wherein the third prism 712 and the fourth prism 714 define a total internal reflection gap 716 therebetween. The total internal reflection gap 716 is used for guiding blue light beams emitted from the first solid state light source 120 and the second solid state light source 140, i.e. the left-eye blue light beam and the right-eye blue light beam in this embodiment, to the wavelength conversion color wheel 200, and reflecting light beams propagated from the wavelength conversion color wheel 200, i.e. the first red primary-color light beam, the first green primary-color light beam, the left-eye blue light beam, the right-eye blue light beam, the second red primary-color light beam, and the second green primary-color light beam in this embodiment, to the multi-band filter 500. The total internal reflection gap 716 includes a dichroic coating film for allowing the blue light beams emitted from the first solid state light source 120 and the second solid state light source 140, i.e. the left-eye blue light beam and the right-eye blue light beam in this embodiment, to pass therethrough, and for reflecting red light beams and green light beams propagated from the wavelength conversion color wheel 200, i.e. the first red primary-color light beam, the first green primary-color light beam, the second red primary-color light beam, and the second green primary-color light beam in this embodiment, to the multi-band filter 500. The copy lenses 722 and 724 are disposed between the wavelength conversion color wheel 200 and the prism group 710.

On the other hand, the optical module 700 further includes a concave mirror 730, a reflective prism 740, a reflective mirror 750, and a condenser lens 760. The concave mirror 730 is used for reflecting light beams transmitted from the wavelength conversion color wheel 200, i.e. the left-eye blue light beam, the right-eye blue light beam, the first red primary-color light beam, and the first green primary-color light beam in this embodiment, to the prism group 710 which then reflects the aforementioned light beams to the multi-band filter 500. The reflective prism 740 is disposed between the multi-band filter 500 and the prism group 710, wherein the reflective prism 740 and the prism group 710 define a total internal reflection gap 742 therein. An interface between the reflective prism 740 and the total internal reflection gap 742 reflects light beams propagated from the multi-band filter 500, i.e. the left-eye blue light beam, the right-eye blue light beam, a portion of the first red primary-color light beam, a portion of the first green primary-color light beam, a portion of the second red primary-color light beam, and a portion of the second green primary-color light beam in this embodiment, to the goal position 600, and allows light beams reflected from the prism group 710 to pass therethrough. The reflective mirror 750 is used for reflecting light beams transmitted from the multi-band filter 500, i.e. a portion of the second red primary-color light beam and a portion of the second green primary-color light beam in this embodiment, back to the multi-band filter 500, such that those light beams can pass through the multi-band filter 500 again and be incident to the reflective prism 740. These light beams are then reflected by the total internal reflection gap 742 and reach the goal position 600. The condenser lens 760 disposed between the reflective prism 740 and the goal position 600 is used for converging light beams propagated from the reflective prism 740 to the goal position 600.

During a particular time period, the red primary-color transmission segment 210, as shown in FIG. 2, of the wavelength conversion color wheel 200 is disposed on the propagation paths of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 112 simultaneously. The left-eye blue light beam and the right-eye blue light beam incident on an interface between the prism group 710 and the dichroic coating film at a small angle, such that the left-eye blue light beam and the right-eye blue light beam pass through the interface and the dichroic coating film. After light beam is converged by the copy lens 722 and 724, the left-eye blue light beam and the right-eye blue light both impinge on the red primary-color transmission segment 210 of the wavelength conversion color wheel 200. The left-eye blue light beam and the right-eye blue light beam pass through the red primary-color transmission segment 210, and are converted into the first red primary-color light beam with the red primary-color wavelength range, as shown in the area R of FIG. 4. Then, the first red primary-color light beam, as shown by the path 114, is reflected by the concave mirror 730 to the copy lenses 724 and 722 which diverge the first red primary-color light beam to be a parallel light beam. The first red primary-color light beam then is incident on the dichroic coating film of the total internal reflection gap 716, and is reflected to the total internal reflection gap 742. The first red primary-color light beam which is incident on interfaces of the total internal reflection gap 742 at a small angle passes through the total internal reflection gap 742 and reaches the multi-band filter 500. Since only a portion of the first red primary-color light beam, i.e. the first red primary-color light beam with a wavelength range above 630 nm, is reflected by the multi-band filter 500, the portion of the first red primary-color light beam is then reflected to the total internal reflection gap 742 again. The portion of the first red primary-color light beam which is incident on the interface of the total internal reflection gap 742 at a large angle is reflected, and reaches the goal position 600 to be the left-eye red primary-color light beam converged by the condenser lens 760.

It should be noted that, the multi-band filter 500 allows another portion of the first red primary-color light beam, i.e. the first red primary-color light beam with a wavelength range between 580 nm to 630 nm, to pass therethrough, and the portion of the first red primary-color light beam can be reflected back to the total internal reflection gap 742 by the reflective mirror 750. This light beam is then reflected to the condenser lens 760 to be converged. However, it can be designed that a focal point of the first primary-color light beam with a wavelength range above 630 nm is disposed in the goal position 600, while a focal point of the first primary-color light beam with a wavelength range between 580 nm and 630 nm is disposed outside the goal position 600 to avoid unnecessary light beams being collected.

During a next time period, the green primary-color transmission segment 230, as shown in FIG. 2, of the wavelength conversion color wheel 200 is disposed on the propagation path of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 112 simultaneously. The left-eye blue light beam and the right-eye blue light beam pass through the green primary-color transmission segment 230, and are converted into the first green primary-color light beam with the green primary-color wavelength range, as shown in the area G of FIG. 4. The first green primary-color light beam is then guided to the multi-band filter 500 by the optical module 700 along the path 114. Since only a portion of the first green primary-color light beam, i.e. the first green primary-color light beam with a wavelength range between 530 nm to 580 nm, is reflected by the multi-band filter 500, the portion of the first green primary-color light beam is then reflected to the condenser lens 760 along the path 114, and is guided to the goal position 600 to be the left-eye green primary-color light beam. Similarly, although the first green primary-color light beam with a wavelength range between 480 nm and 530 nm also reaches the condenser lens 760 through the transmission of the multi-band filter 500 and is reflected by the reflective mirror 750, it can avoid collecting the portion of the first green primary-color light beam using the method mentioned above.

During the next time period, the left-eye blue light filtering segment 250, as shown in FIG. 2, of the wavelength conversion color wheel 200 is disposed on the propagation paths of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 112 simultaneously. The left-eye blue light beam passes through the left-eye blue light filtering segment 250 and maintains its wavelength range, but the right-eye blue light beam is filtered by the left-eye blue light filtering segment 250. The left-eye blue light beam passing through the wavelength conversion color wheel 200 is incident on the interface of the total internal reflection gap 716 at a large angle which reflects the left-eye blue light beam to the multi-band filter 500 along the path 114. Since the multi-band filter 500 reflects the left-eye blue light beam, the left-eye blue light beam is reflected to the condenser lens 760 and reaches the goal position 600 along the path 114.

Figure 6:
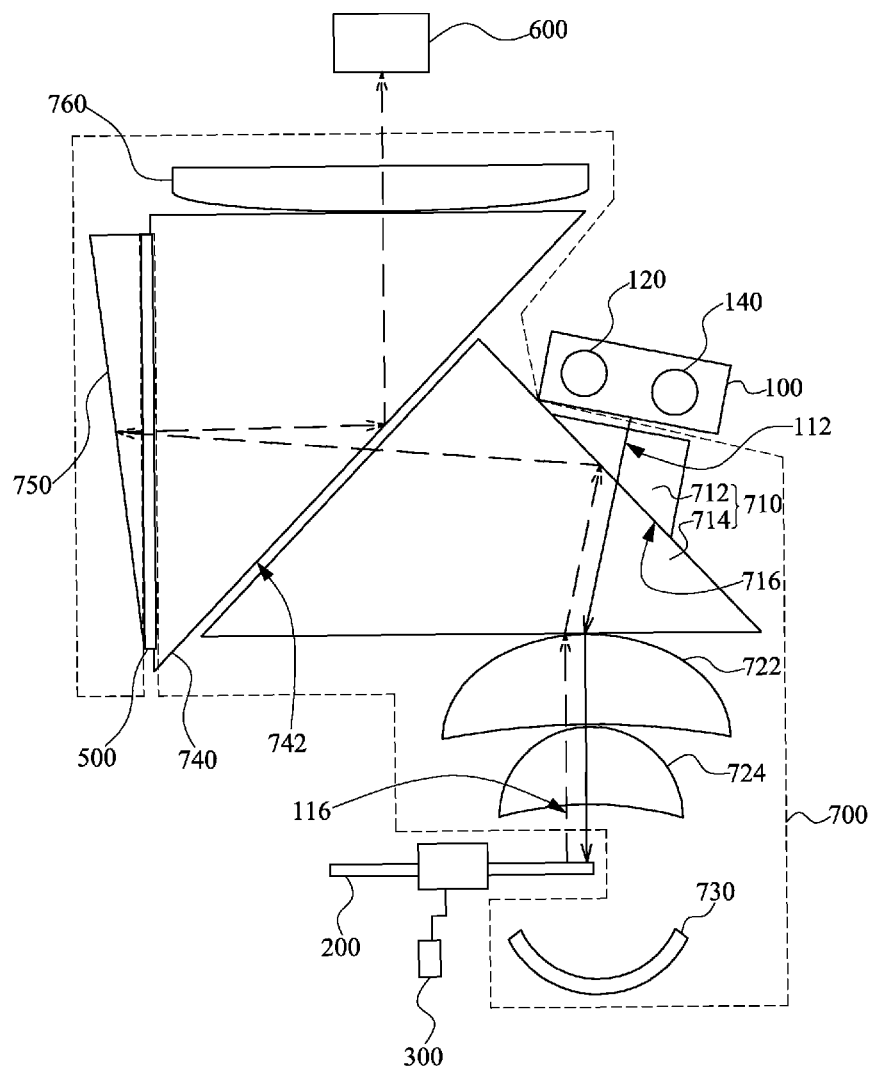
FIG. 6 is an optical path schematic diagram for the solid state illuminator for a stereoscopic display in another plurality of time periods according to another embodiment of the present invention.

FIG. 6 is an optical path schematic diagram of the solid state illuminator for a stereoscopic display in another time periods according to another embodiment of the present invention. During the next time period, the red primary-color reflection segment 220, as shown in FIG. 2, of the wavelength conversion color wheel 200 is disposed on the propagation path of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 112 simultaneously. The left-eye blue light beam and the right-eye blue light beam are reflected by the red primary-color reflection segment 220, and are converted into the second red primary-color light beam with the red primary-color wavelength range, as shown in the area R of FIG. 4. Then, the second red primary-color light beam, as shown by the path 116, is reflected back to the copy lenses 722 and 724 which diverge the second red primary-color light beam to be a parallel light beam. The second red primary-color light beam is then incident on the dichroic coating film of the total internal reflection gap 716, and is reflected to the total internal reflection gap 742. The second red primary-color light beam which is incident on the interface of the total internal reflection gap 742 at a small angle passes through the total internal reflection gap 742 and reaches the multi-band filter 500. Since only a portion of the second red primary-color light beam, i.e. the second red primary-color light beam with a wavelength range between 580 nm to 630 nm, passes through the multi-band filter 500, the portion of the second red primary-color light beam then passes through the multi-band filter 500 and to the reflective mirror 750. After being reflected by the reflective mirror 750, the portion of the second red primary-color light beam passes through the multi-band filter 500 again to the total internal reflection gap 742. The portion of the second red primary-color light beam which is incident on the interface of the total internal reflection gap 742 at a large angle is reflected to the goal position 600 to be the right-eye red primary-color light beam with light beam converged by the condenser lens 760. Similarly, although the second red primary-color light beam with a wavelength range above 630 nm also reaches the condenser lens 760 by the reflection of the multi-band filter 500, it can avoid collecting this portion of the second red primary-color light beam using the method mentioned above.

During the next time period, the green primary-color reflection segment 240, as shown in FIG. 2, of the wavelength conversion color wheel 200 is disposed on the propagation paths of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 112 simultaneously. The left-eye blue light beam and the right-eye blue light beam are reflected by the green primary-color reflection segment 240, and are converted into the second green primary-color light beam with the green primary-color wavelength range, as shown in the area G of FIG. 4. The second green primary-color light beam is then guided to the multi-band filter 500 by the optical module 700 along the path 116. Since only a portion of the second green primary-color light beam, i.e. the second green primary-color light beam with a wavelength range between 480 nm to 530 nm, passes through the multi-band filter 500, the portion of the second green primary-color light beam then passes through the multi-band filter 500 to the reflective mirror 750, and is guided to the goal position 600 to be the right-eye green primary-color light beam along the path 116. Similarly, although the second green primary-color light beam with a wavelength range between 530 nm and 580 nm also reaches the condenser lens 760 through the reflection of the multi-band filter 500, it can avoid collecting this portion of the second green primary-color light beam using the method mentioned above.

Reference is made back to FIG. 5. During the next time period, the right-eye blue light filtering segment 260, as shown in FIG. 2, of the wavelength conversion color wheel 200 is disposed on the propagation paths of the left-eye blue light beam and the right-eye blue light beam by the actuator 300. The left-eye blue light beam and the right-eye blue light beam which are respectively emitted from the first solid state light source 120 and the second solid state light source 140 propagate to the wavelength conversion color wheel 200 along the path 112 simultaneously. The right-eye blue light beam passes through the right-eye blue light filtering segment 260 and maintains its wavelength range, but the left-eye blue light beam is filtered by the right-eye blue light filtering segment 260. The right-eye blue light beam passing through the wavelength conversion color wheel 200 is guided to the multi-band filter 500 by the optical module 700 along the path 114. Since the multi-band filter 500 reflects the right-eye blue light beam, the right-eye blue light beam is reflected to the condenser lens 760 which converges the right-eye blue light beam to the goal position 600.

As a result, the solid state illuminator for a stereoscopic display can generate left-eye light beams and right-eye light beams with three different primary colors in sequence as long as the actuator 300 rotates the wavelength conversion color wheel 200 in the way mentioned above. In addition, the size of the solid state illuminator for a stereoscopic display can be reduced through the design of the optical module 700, and the alignment problem on a screen of left-eye images and right-eye images can also be solved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A solid state illuminator for a stereoscopic display, the solid state illuminator comprising:
    at least one first solid state light source for providing a first light beam with a first wavelength range;
    a wavelength conversion color wheel, comprising at least one first transmission segment and at least one first reflection segment;
    an actuator for rotating the wavelength conversion color wheel, wherein when the first light beam impinges on the first transmission segment, the first light beam passes through the first transmission segment and is converted into a second light beam with a second wavelength range, and when the first light beam impinges on the first reflection segment, the first light beam is reflected by the first reflection segment and is converted into a third light beam with the second wavelength range;
    a multi-band filter for allowing at least one portion of each of the second light beam and the third light beam to pass therethrough, and reflecting at least one another portion of each of the second light beam and the third light beam, wherein the wavelength ranges of the two portions are not overlapped; and
    an optical module for guiding the second light beam and the third light beam to the multi-band filter, such that the portion of one of the second light beam and the third light beam passes through the multi-band filter and reaches a goal position, and the another portion of the other of the second light beam and the third light beam is reflected by the multi-band filter and reaches the goal position.

2. The solid state illuminator of claim 1, wherein the wavelength conversion color wheel further includes a first filtering segment, the first light beam passing through the first filtering segment without converting its first wavelength range when the first light beam impinges on the first filtering segment; and
    wherein the optical module is further used for guiding the first light beam to the multi-band filter, such that the first light beam is reflected by the multi-band filter and reaches the goal position.

3. The solid state illuminator of claim 1, wherein the wavelength conversion color wheel further includes at least one second transmission segment and at least one second reflection segment; when the first light beam impinges on the second transmission segment, the first light beam passes through the second transmission segment and is converted into a fourth light beam with a third wavelength range; and when the first light beam impinges on the second reflection segment, the first light beam is reflected by the second reflection segment and is converted into a fifth light beam with the third wavelength range;
    wherein the multi-band filter is further used for allowing at least one portion of each of the fourth light beam and the fifth light beam to pass therethrough, and reflecting at least one another portion of each of the fourth light beam and the fifth light beam, wherein the wavelength ranges of the two portions are not overlapped; and
    wherein the optical module is further used for guiding the fourth light beam and the fifth light beam to the wavelength conversion color wheel, such that the portion of one of the fourth light beam and the fifth light beam passes through the multi-band filter and reaches the goal position, and at least another one portion of the other of the fourth light beam and the fifth light beam is reflected by the multi-band filter and reaches the goal position.

4. The solid state illuminator of claim 1, further comprising at least one second solid state light source for providing a sixth light beam with a fourth wavelength range;
    wherein the wavelength conversion color wheel further comprises a second filtering segment, the sixth light beam passing through the second filtering segment without converting its fourth wavelength range when the sixth light beam impinges on the second filtering segment; and
    wherein the optical module is further used for guiding the sixth light beam to the multi-band filter, such that the sixth light beam is reflected by the multi-band filter and reaches the goal position.

5. The solid state illuminator of claim 4, wherein the sixth light beam also passes through the first transmission segment and is converted into the second light beam with the second wavelength range when the sixth light beam impinges on the first transmission segment.

6. The solid state illuminator of claim 4, wherein the sixth light beam is also reflected by the first reflection segment and is converted into the third light beam with the second wavelength range when the sixth light beam impinges on the first reflection segment.

7. The solid state illuminator of claim 1, wherein the optical module comprises a reflective minor and a dichroic mirror, wherein the reflective mirror is used for reflecting the third light beam to the dichroic minor, and the dichroic mirror is used for reflecting the third light beam to the multi-band filter.

8. The solid state illuminator of claim 7, wherein the dichroic mirror is disposed between the first light source and the reflective mirror, the first light beam passes through the dichroic mirror, and the reflective minor is further used for reflecting the first light beam to the wavelength conversion color wheel.

9. The solid state illuminator of claim 8, wherein the optical module further comprises a plurality of condenser lenses disposed between the reflective mirror and the dichroic minor, and disposed between the reflective mirror and the wavelength conversion color wheel, respectively.

10. The solid state illuminator of claim 1, wherein the optical module comprises a reflective mirror and a prism group, wherein the reflective mirror is used for reflecting the second light beam to the prism group, and the prism group is used for reflecting the second light beam to the multi-band filter.

11. The solid state illuminator of claim 10, wherein the prism group is disposed between the multi-band filter and the goal position, the prism group is configured for allowing the first light beam, the second light beam, and the third light beam all propagated from the multi-band filter to pass therethrough.

12. The solid state illuminator of claim 10, wherein the optical module further comprises a plurality of condenser lenses disposed between the wavelength conversion color wheel and the reflective minor, between the reflective mirror and the prism group, and between the prism group and the goal position, respectively.

13. The solid state illuminator of claim 1, wherein the optical module comprises a prism group for reflecting the third light beam to the multi-band filter.

14. The solid state illuminator of claim 13, wherein the prism group is disposed between the first light source and the wavelength conversion color wheel, and the prism group is configured for allowing the first light beam to pass therethrough.

15. The solid state illuminator of claim 13, wherein the optical module comprises a concave mirror for reflecting the first light beam and the second light beam to the prism group, and the prism group is further used for reflecting the first light beam and the second light beam to the multi-band filter.

16. The solid state illuminator of claim 13, wherein the optical module further comprises a reflective prism, wherein the reflective prism and the prism group define a total internal reflection gap therebetween, and an interface between the reflective prism and the total internal reflection gap is used for reflecting the first light beam, the second light beam, and the third light beam all propagated from the multi-band filter to the goal position.

17. The solid state illuminator of claim 16, wherein the reflective prism is disposed between the multi-band filter and the prism group, and the interface between the reflective prism and the total internal reflection gap is configured for allowing light beams propagated from the prism group to pass therethrough.

18. The solid state illuminator of claim 16, wherein the optical module further comprises a condenser lens disposed between the reflective prism and the goal position.

19. The solid state illuminator of claim 13, wherein the optical module further comprises a reflective minor for reflecting the third light beam transmitted from the multi-band filter back to the multi-band filter, such that the third light beam passes through the multi-band filter again and is incidents to the reflective prism, and then the third light beam reaches the goal position through the reflection by the total internal reflection gap.

20. The solid state illuminator of claim 13, wherein the optical module further comprises a plurality of copy lenses disposed between the wavelength conversion color wheel and the prism group.

* * * * *